(12) United States Patent
Huang et al.

(10) Patent No.: US 11,881,911 B2
(45) Date of Patent: Jan. 23, 2024

(54) ALTERNATING COMMUNICATION FOR WIRELESS POWER TRANSFER

(71) Applicant: Renesas Electronics America Inc., Milpitas, CA (US)

(72) Inventors: Jiangjian Huang, San Jose, CA (US); Hulong Zeng, San Jose, CA (US); Gopinath Akkinepally, San Jose, CA (US); Amit Dharmendra Bavisi, Saratoga, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 322 days.

(21) Appl. No.: 17/475,814

(22) Filed: Sep. 15, 2021

(65) Prior Publication Data
US 2023/0084847 A1    Mar. 16, 2023

(51) Int. Cl.
| | |
|---|---|
| *H04L 27/04* | (2006.01) |
| *H04B 5/00* | (2006.01) |
| *H04L 27/06* | (2006.01) |
| *H04L 27/14* | (2006.01) |
| *H02J 50/80* | (2016.01) |
| *H04L 27/12* | (2006.01) |
| *H02J 50/12* | (2016.01) |

(52) U.S. Cl.
CPC ............ *H04B 5/0037* (2013.01); *H02J 50/80* (2016.02); *H04L 27/04* (2013.01); *H04L 27/06* (2013.01); *H04L 27/12* (2013.01); *H04L 27/14* (2013.01); *H02J 50/12* (2016.02)

(58) Field of Classification Search
CPC ....... H04B 5/0037; H04L 27/04; H04L 27/06; H04L 27/12; H04L 27/14; H02J 50/80
See application file for complete search history.

(56) References Cited

U.S. PATENT DOCUMENTS

2005/0232376 A1 * 10/2005 Liem ................... B60C 23/0418
375/322

* cited by examiner

*Primary Examiner* — Rahel Guarino
(74) *Attorney, Agent, or Firm* — SCULLY, SCOTT, MURPHY & PRESSER, P.C.

(57) ABSTRACT

Systems and apparatuses for wireless power transfer system are described. A receiver may send an amplitude shift key (ASK) signal to a transmitter. The transmitter may receive the ASK signal from the receiver. The transmitter may perform a demodulation on the ASK signal. The transmitter may, in response to a failure to demodulate the ASK signal, encode a notification of failure in a frequency shift key (FSK) signal. The transmitter may transmit the FSK signal to the receiver. The receiver may receive the FSK signal. The receiver may perform a function to resolve the failure to demodulate the ASK signal.

20 Claims, 4 Drawing Sheets

ALTERNATING COMMUNICATION FOR WIRELESS POWER TRANSFER

BACKGROUND

The present disclosure relates in general to apparatuses and methods for communication between wireless power transmitters and wireless power receivers.

A wireless power system can include a transmitter having a transmission coil and a receiver having a receiver coil. The transmission coil and the receiver coil can be brought close to one another to form a transformer that can facilitate inductive transmission of alternating current (AC) power. The receiver can include a rectifier circuit that can convert the AC power into direct current (DC) power for various loads or components that require DC power to operate. The transmitter and receiver can also exchange other types of messages using various modulation schemes. For example, the receiver can include a resonant circuit having one or more capacitors. The receiver can switch in or switch out different number of capacitors of the resonant circuit to generate amplitude shift key (ASK) signals and encode messages in the ASK signals. The receiver can transmit the ASK signals to the transmitter to communicate with the transmitter. The transmitter can decode the messages from the ASK signals received from the receiver. The transmitter may generate frequency shift key (FSK) signals, encode response messages in the FSK signals, and send the FSK signals to the receiver to respond to the messages.

SUMMARY

In some examples, an apparatus for wireless power transfer is generally described. The apparatus may include a controller configured to receive an amplitude shift key (ASK) signal from a device. The controller may be further configured to perform a demodulation on the ASK signal. The controller may be further configured to, in response to a failure to demodulate ASK signal, encode a notification of failure in a frequency shift key (FSK) signal. The controller may be further configured to transmit the FSK signal to the device.

In some examples, an apparatus for wireless power transfer is generally described. The apparatus may include a controller configured to send an amplitude shift key (ASK) signal to a device. The controller may be further configured to receive a frequency shift key (FSK) signal that encodes a notification of failure indicating a failure to demodulate the ASK signal. The controller may be further configured to perform a function to resolve the failure to demodulate the ASK signal.

In some examples, a wireless power transfer system is generally described. The wireless power transfer system may include a transmitter and a receiver configured to be in communication with the transmitter. The receiver may be configured to send an amplitude shift key (ASK) signal to the transmitter. The transmitter may be configured to receive the ASK signal from the receiver. The transmitter may be further configured to perform a demodulation on the ASK signal. The transmitter may be further configured to, in response to a failure to demodulate the ASK signal, encode a notification of failure in a frequency shift key (FSK) signal. The transmitter may be further configured to transmit the FSK signal to the receiver. The receiver may be further configured to receive the FSK signal. The receiver may be further configured to perform a function to resolve the failure to demodulate the ASK signal.

Further features as well as the structure and operation of various embodiments are described in detail below with reference to the accompanying drawings. In the drawings, like reference numbers indicate identical or functionally similar elements.

DETAILED DESCRIPTION

Figure 1:
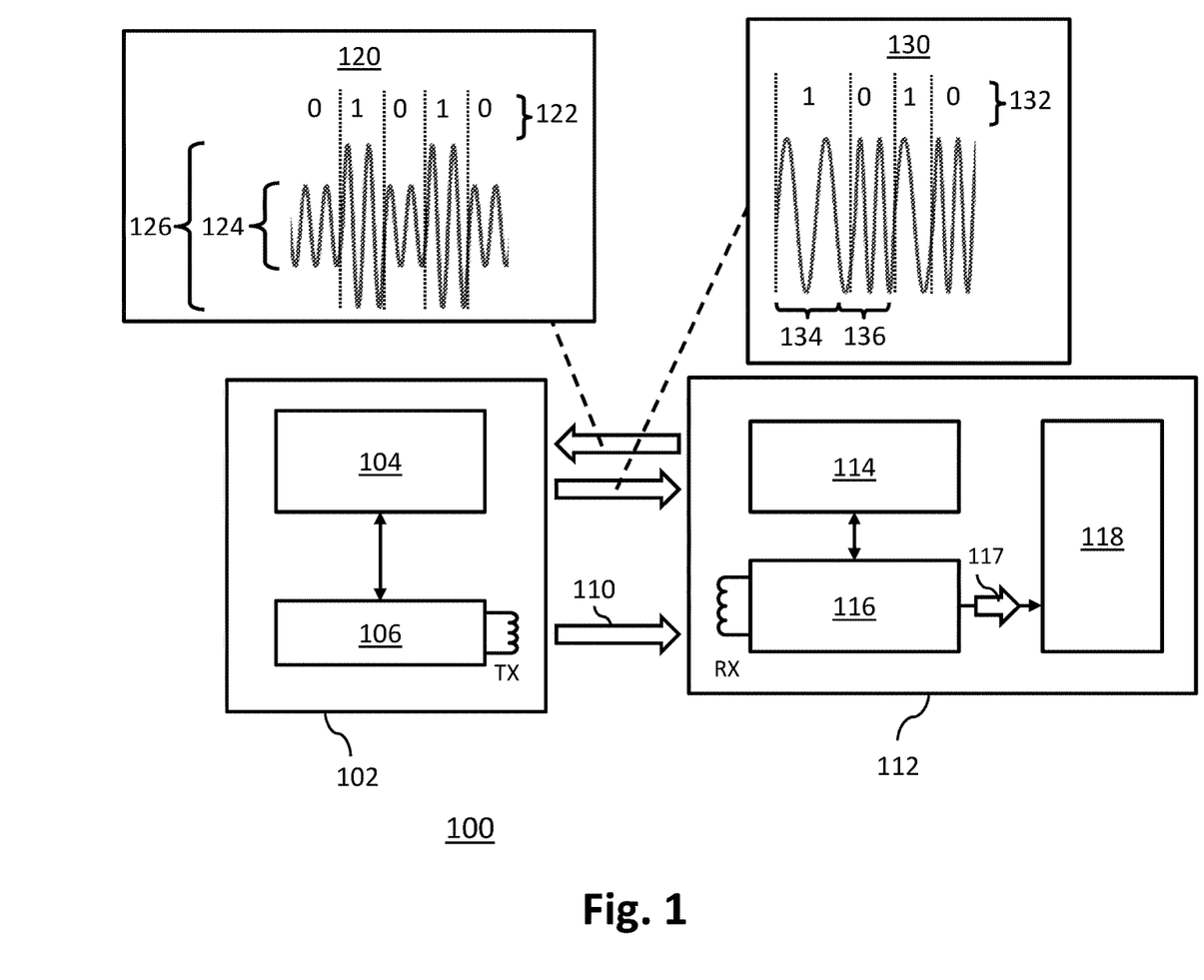
FIG. 1 is a diagram showing an example system that can implement alternating communication for wireless power transfer in one embodiment.

FIG. 1 is a diagram showing an example system 100 that can implement alternating communication for wireless power transfer in one embodiment. The system 100 can be a wireless communication system that can facilitate wireless transfer of power and/or wireless transmission of data. The system 100 can include a transmitter 102 and a receiver 112 configured to be in communication with each other. The transmitter 102 can be a wireless power transmitter connected to a DC power supply and can transmit AC power from the connected DC power supply. The transmitter 102 can include a controller 104 and a power driver 106. The power driver 106 can include a coil, labeled as TX. The controller 104 can be configured to control and operate the power driver 106. In an example, the controller 104 can be configured to control the power driver 106 to drive the Coil TX to produce a magnetic field. The power driver 106 can drive the Coil TX at a range of frequencies and configurations defined by wireless power standards, such as the Wireless Power Consortium (Qi) standard, the Power Matters Alliance (PMA) standard, and/or the Alliance for Wireless Power (A for WP, or Rezence) standard.

The receiver 112 can be a wireless power receiver that can be located in, for example, a computing device, a mobile phone, a tablet device, a wearable device, and/or other electronic devices that can be configured to receive power wirelessly. The receiver 112 can include a controller 114 and a power rectifier 116. The power rectifier 116 can include a coil, labeled as RX. The magnetic field produced by the Coil TX of the power driver 106 can induce a current in the Coil RX of the power rectifier 116. The induced current can cause an amount of AC power 110 to be inductively transmitted from the power driver 106 to the power rectifier 116. The power rectifier 116 can receive the AC power 110 and convert the AC power 110 into direct current (DC) power 117, and provide the DC power 117 to load 118. The load 118 can be, for example, a battery charger configured to charge a battery, a DC-DC converter configured to supply a processor or a display, and/or other electronic components that require the DC power 117 to operate.

In an example, the transmitter 102 and the receiver 112 may exchange other types of messages or data. For example, before the transmitter 102 starts transferring power to the receiver 112, a power contract may be agreed upon and created by the receiver 112 and the transmitter 102. In an example, the receiver 112 may send communication packets indicating power transfer information such as, for example, an amount of power to be transferred to the receiver 112, commands to increase, decrease, or maintain a power level of the AC power 110, commands to stop a power transfer, etc. The power contract between the transmitter 102 and the receiver 112 may include these power transfer information. In another example, in response to the receiver 112 being brought in proximity to the transmitter 102 (e.g., close enough such that a transformer may be formed by the Coil TX and Coil RX to facilitate power transfer), the receiver 112 may initiate communication by sending a signal to the transmitter 102 to request power transfer, and the transmitter 102 may respond to the receiver 112 to establish the power contract or to begin power transfer to the receiver (e.g., if the power contract is already in place).

The communication packet from the receiver 112 to the transmitter 102 may be an amplitude shift key (ASK) signal. An ASK signal can be an amplitude modulated signal that represents digital data using variations in the amplitude of a carrier wave. The communication packet from the transmitter 102 to the receiver 112 may be a frequency shift key (FSK) signal. A FSK signal can be a frequency modulated signal that represents digital data using variations in the frequency of a carrier wave.

In an example, some wireless power transfer systems may configure a power transmitter as a passive device in terms of communication. For example, the power transmitter may use FSK signals to respond to messages encoded in ASK signals transmitted from a power receiver, instead of having the power transmitter initiate communication with the power receiver. As a result of configuring the power transmitter as a passive device, the power transmitter may not initiate communications to the power receiver. For example, the power transmitter may not notify the power receiver if there are problems with the ASK signals received from the power receiver. Such problems can include, for example, a failure to demodulate the ASK signals due to demodulation quality issues. An example of demodulation quality issue can be, for example, undetectable differences between the different amplitudes among the received ASK signals. For example, a difference between amplitudes in an ASK signal may be undetectable if the difference between the amplitudes are too small to be distinguishable from one another. In some examples, noise added to the ASK signal during the transmission of the ASK signal may alter the amplitudes of the ASK signal and may reduce the difference between the amplitudes as well. In another example, the distortion level of the ASK signal may be significant to the point where the waveform of the ASK signal deviates from a square waveform too much, making it difficult to be decoded. Conventionally, in response to a failure to demodulate ASK signals, the power transmitter may modify the received ASK signals to amplify the amplitude differences among the ASK signals, or the power transmitter may stop transfer of power to the power receiver. For example, the power transmitter may add a disturbance (e.g., apply specific or additional voltage or current) to one of an input voltage, a working frequency, or a duty cycle of the power transmitter. However, the power receiver may not be aware of such demodulation quality issues and may continue to transmit other ASK signals having the same undesired demodulation quality in future instances.

The transmitter 102 and the receiver 104 of system 100 may be configured to address demodulation quality issues by configuring the transmitter 102 to notify the receiver 104 in response to a failure to demodulate an ASK signal received from the receiver 112. Further, the receiver 112 may perform one or more actions in response to the notification by the transmitter 102. For example, the receiver 112 may reconfigure specific settings, such as changing a modulation capacitor value, changing the ASK modulation from capacitive modulation to resistive modulation, changing a rectifier voltage target, or changing a load current, etc., to adjust a quality of ASK signals that may be transmitted to the transmitter 102 in future instances.

In an example, when a rectifier voltage in the receiver 112 increases, the receiver 112 is asking for more power from the transmitter 102, and when the rectifier voltage is lowered, the receiver 112 is asking the transmitter 102 for less power. Therefore, the receiver 112 may make changes to the rectifier voltage to control the load or power consumption by the receiver 112, regardless of commands being issues by the controller 114 or other controllers (e.g., application processor if the receiver 112 is housed in a mobile phone). In another example, if the receiver 112 is being implemented in phones, such as a mobile phone, having an application processor, the application processor may determine whether to change the load current or other conditions relating to the load to optimize a quality of the ASK signals being transmitted from the receiver 112 to the transmitter 102.

As a result of having the transmitter 102 notifying the receiver 112 of the failed attempts to demodulate ASK signals, the receiver 112 may be reconfigured to improve ASK signal quality in future instances instead of being unaware of the demodulation quality of the ASK signals being generated and outputted by the receiver 112. Further, the functionality to generate the FSK signal to notify the receiver 112 of the failed demodulation may be added to an existing wireless power transmitter without modifying existing capabilities of the wireless power transmitter. For example, the transmitter 102 may perform both 1) notification to the receiver 112 of the failed demodulation and 2) adding a disturbance to amplify the amplitude difference in the ASK signal.

In an example shown in FIG. 1, the receiver 112 may generate an ASK signal 120 to encode a message 122 (e.g., bit stream of 01010) using ASK modulation. In an example, the message 122 may specify power transfer information such as, for example, an amount of power to be transferred to the receiver 112, commands to increase, decrease, or maintain a power level of the AC power 110, commands to stop a power transfer, etc. The receiver 112 may transmit the ASK signal 120 to the transmitter 102. The ASK signal 120 may be a carrier wave having a variable amplitude that varies between a amplitude 124 and a amplitude 126, while being maintained at a fixed frequency. The amplitude 124 may represent or encode the binary value of 0, and the amplitude 126 may represent or encode the binary value of 1. It will be apparent to a person of ordinary skill in the art that the binary values being encoded in the different amplitudes can be arbitrary. For example, another embodiment may use the amplitude 124 to encode the binary value of 1 and the amplitude 126 to encode the binary value of 0. The receiver 112 may transmit the ASK signal 120 to the transmitter 102 using inductive transmission from the Coil RX to the Coil TX. In an example, the wireless power standard Qi is in-band communication. Therefore, the ASK signal 120 may be added to a power signal being transferred from the transmitter 102 to the receiver 112. The transmitter 102 may be configured to filter out the ASK signal 120 during power transfer, allowing communication using ASK signal 120 and power transfer to occur at the same time.

The controller 104 of the transmitter 102 may receive the ASK signal 120, and may be configured to demodulate the ASK signal 120 in order to decode the message 122 from the ASK signal 120. For example, the controller 104 may be configured to detect amplitude differences among the ASK signal 120, and may measure the different amplitude values of the ASK signal 120. The controller 104 may be configured to assign different measured amplitudes to different binary values to decode the message 122. For example, the controller 104 may measure the amplitude 124 and assign segments of the ASK signal 120 having the amplitude 124 to binary 0, and may measure the amplitude 126 and assign segments of the ASK signal 120 having the amplitude 126 to binary 1. Although the ASK signal 120 shown in the example of FIG. 1 has two different amplitudes, the ASK signals being generate and transmitted by the receiver 112 may be carrier waves using two or more different amplitudes to encode messages.

In an example, if the transmitter 102 fails to detect the amplitude difference between the amplitudes 124 and 126, the transmitter 102 may generate a FSK signal 130 to encode a message 132 (e.g., bit stream of 1010) using FSK modulation. The message 132 may be, for example, a notification that there is a failed attempt to demodulate the ASK signal 120 and/or a request to the receiver 112 to perform one or more actions to address the failed attempt to demodulate the ASK signal 120. The transmitter 102 may transmit the FSK signal 130 to the receiver 112. The FSK signal 130 may be a carrier wave having a variable frequency that varies between a frequency 134 and a frequency 136, while being maintained at a fixed amplitude. In an example, the frequency 134 may represent or encode the binary value of 1, and the frequency 136 may represent or encode the binary value of 0. It will be apparent to a person of ordinary skill in the art that the binary values being encoded in the different frequencies can be arbitrary. For example, another embodiment may use the frequency 134 to encode the binary value of 0 and the frequency 136 to encode the binary value of 1. The transmitter 102 may transmit the FSK signal 130 to the receiver 112 using inductive transmission from the Coil TX to the Coil RX coil. In an example, the transmitter 102 may modulate the FSK signal 130 onto the AC power 110 being transferred to receiver 112.

The receiver 112 may receive the FSK signal 130 and, in response, demodulate the FSK signal 130 to decode the message 132. For example, the controller 114 may measure the frequency 134 and assign segments of the FSK signal 130 having the frequency 134 to binary 1, and may measure the frequency 136 and assign segments of the FSK signal 130 having the frequency 136 to binary 0. Although the FSK signal 130 shown in the example of FIG. 1 has two different frequencies, the FSK signals being generated and transmitted by the transmitter 102 may be carrier waves using two or more different frequencies to encode messages. The receiver 112 may decode the message 132 and, in response, perform one or more actions to address the failure to demodulate the ASK signal 120.

In an example, a firmware of the receiver 112 may be configured to interpret the message 132 and provide commands to the controller 114 to perform one or more actions or functions to address the failure to demodulate the ASK signal 120. For example, in response to the message 132 indicating a failed attempt to demodulate the ASK signal 120, the controller 114 may resend the ASK signal 120 to the transmitter 120, and/or reconfigure the receiver 112 to perform one or more actions that may improve a success rate of demodulating the ASK signal 120, and/or other ASK signals in future instances. For example, the controller 114 may change a modulation capacitor value by using different number of capacitors to perform the ASK modulation. The different modulation capacitor values may cause the difference between the amplitudes 124 and 126 to change, such as increasing the amplitude difference in order to increase a success rate of detecting the different amplitudes in the ASK signal 120. In another example, the controller 114 may change a mode of modulation, such as changing the ASK modulation from capacitive modulation to resistive modulation (e.g., ASK modulation based on resistor values instead of capacitance). For example, in a corner case with a small air gap and light load, resistive modulation may be preferable because the capacitive modulation's quality may be degraded but resistive modulation's quality may be maintained at a relatively good quality. Therefore, whether the controller 114 changes a mode of modulation may depend on an operation status and environment of the system 100.

Figure 2:
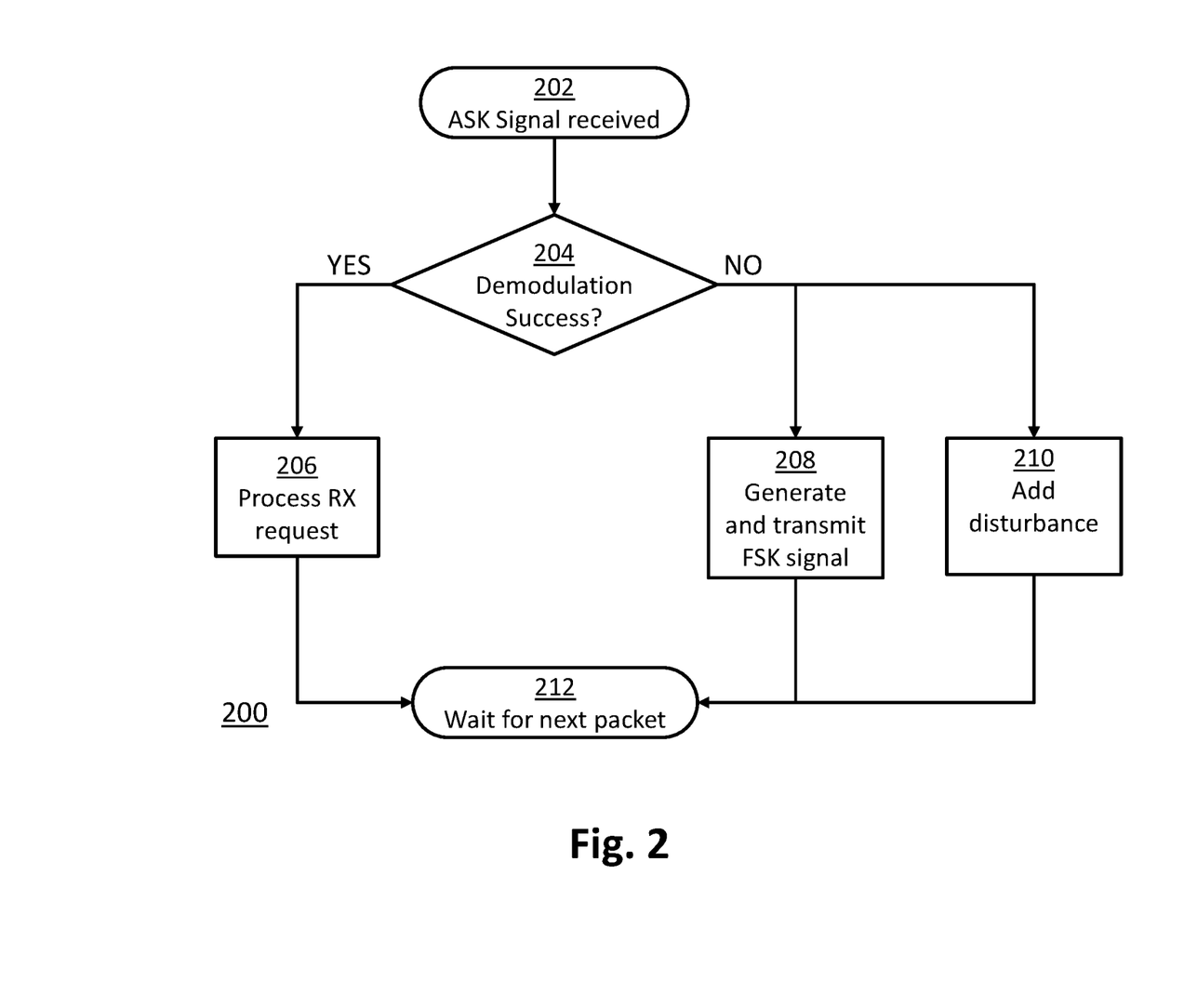
FIG. 2 is a flow diagram illustrating a process being performed by a power transmitter to implement alternating communication for wireless power transfer in one embodiment.

FIG. 2 is a flow diagram illustrating a process 200 being performed by a power transmitter to implement alternating communication for wireless power transfer in one embodiment. The process 200 may include one or more operations, actions, or functions as illustrated by one or more of blocks 202, 204, 206, 208, 210, and/or 212. Although illustrated as discrete blocks, various blocks can be divided into additional blocks, combined into fewer blocks, eliminated, or performed in parallel, and/or performed in different order, depending on the desired implementation.

The process 200 may begin at block 202. At block 202, a power transmitter may receive an ASK signal from a power receiver. The received ASK signal can encode a receiver (RX) message. The RX message can specify, for example, power transfer information such as, for example, an amount of power to be transferred to the power receiver, commands to increase, decrease, or maintain a power level of AC power being transferred from the power transmitter to the power receiver, commands to stop a power transfer, etc.

The process 200 may proceed from block 202 to block 204. At block 204, the power transmitter may attempt to demodulate the received ASK signal. In response to a success in demodulating the received ASK signal, the process 200 may proceed to block 206. At block 206, the RX message encoded in the received ASK signal may be decoded. The power transmitter may process the decoded RX message, such as performing one or more functions in accordance with contents of the RX message. For example, the power transmitter may transmit an amount of power, that was specified in the message, to the power receiver.

In response to a failure in demodulating the received ASK signal, the process 200 may proceed to block 208 and/or 210. At block 208, the power transmitter generates a FSK signal encoding a notification and/or a request. The notification can be a transmitter (TX) message indicating a failed attempt to demodulate the received ASK signal, and the request can be a request to the power receiver to perform one or more functions to address the failed demodulation attempt. The power transmitter may transmit the FSK signal to the power receiver. In an example, in addition to block 208, the power transmitter may perform block 210. At block 210, the power transmitter may, for example, apply or add a disturbance to one of an input voltage, a working frequency, or a duty cycle of the power transmitter to modify the amplitudes in the ASK signal. For example, if the ASK signal includes a larger amplitude and a smaller amplitude, the disturbance may increase the larger amplitude and decrease the smaller amplitude such that a difference between the larger amplitude and the smaller amplitude may be increased or amplified. The power transmitter may perform the blocks 208 and 210 in an arbitrary order or in parallel. In an example, the process 200 may proceed from block 208 and/or block 210 to block 212. At block 212, the power transmitter may wait for a next ASK signal from the power receiver. In an example, the power transmitter may receive a new ASK signal that may be generated by the power receiver based on the reconfigured settings of the power receiver, and may attempt to demodulate the new ASK signal.

Figure 3:
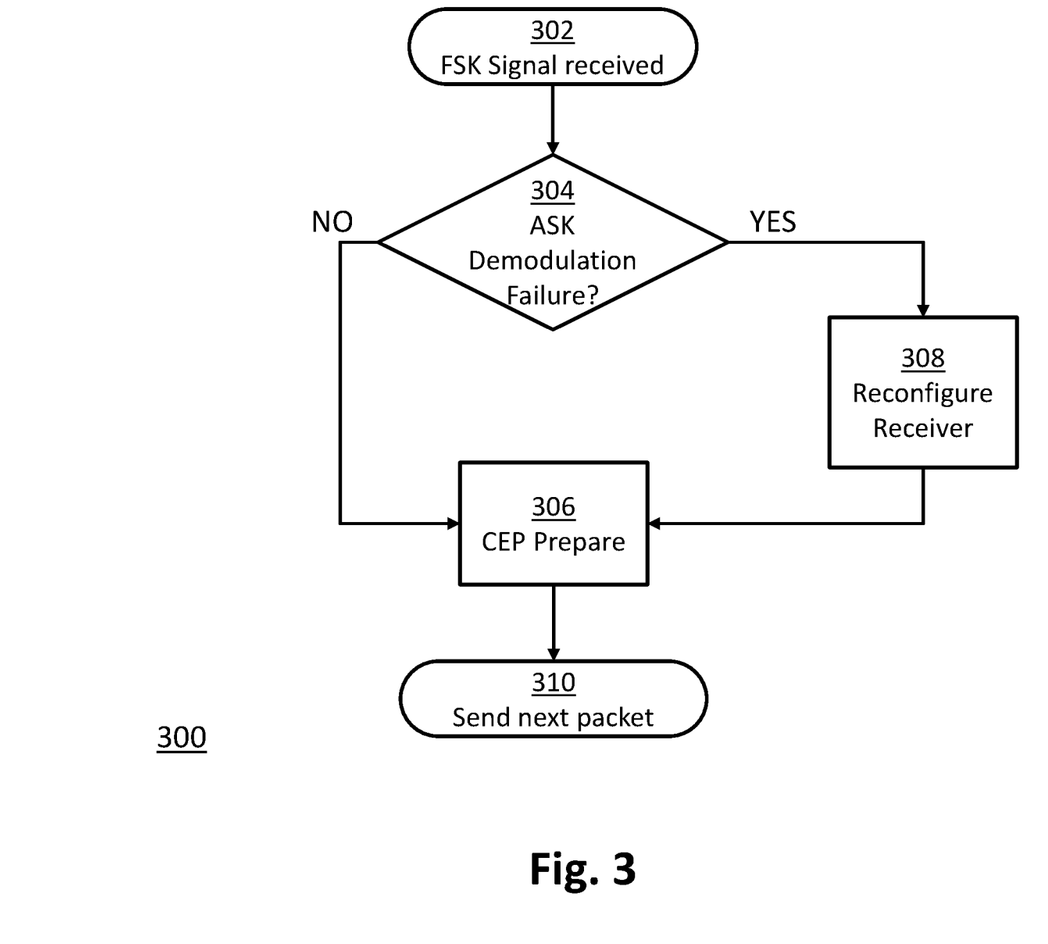
FIG. 3 is a flow diagram illustrating a process being performed by a power receiver to implement alternating communication for wireless power transfer in one embodiment.

FIG. 3 is a flow diagram illustrating a process 300 being performed by a power receiver to implement alternating communication for wireless power transfer in one embodiment. The process 300 may include one or more operations, actions, or functions as illustrated by one or more of blocks 302, 304, 306, 308, and/or 310. Although illustrated as discrete blocks, various blocks can be divided into additional blocks, combined into fewer blocks, eliminated, or performed in parallel, and/or performed in different order, depending on the desired implementation.

The process 300 may begin at block 302. At block 302, a power receiver may receive a FSK signal from a power transmitter. The received FSK signal can encode a TX message. The TX message may be a notification that the power transmitter has failed to demodulate an ASK signal previously transmitted by the power receiver. In an example, the TX message may further include a request to the power receiver to perform one or more functions to address the failed demodulation attempt.

The process 300 may proceed from block 302 to block 304. At block 304, the power receiver may demodulate the FSK signal to determine whether a notification of failed demodulation of ASK signal is in the TX message encoded in the FSK signal. In response to the TX message not including the notification, the process 300 may proceed to block 306. At block 306, the power receiver may prepare a control error packet (CEP) that may be sent to the power transmitter periodically. In an example, the CEP is the feedback signal from the power receiver to the power transmitter. When the CEP is greater than 0, the power receiver may ask the power transmitter for more power. When the CEP is less than 0, the power receiver may ask the power transmitter for less power. When the CEP is 0, the power receiver may ask the power transmitter to keep providing the same power. The process 300 may proceed from block 306 to block 310 where the power receiver may continue its operation and send a next ASK signal.

In response to the TX message including the notification, the process 300 may proceed to block 308. At block 308, the power receiver may perform one or more functions to address the failed demodulation. In an example, the TX message encoded in the FSK signal may include the notification but not the request to perform the one or more functions, and the power receiver may be configured or programmed to autonomously perform the one or more functions to address the failed demodulation in response to detecting the notification in the TX message encoded in the FSK signal. In another example, the TX message encoded in the FSK signal may include the request to perform the one or more functions and the power receiver may perform the requested functions in block 308. In an example, at block 308, the power receiver may resend the ASK signal to the power transmitter (e.g., as a next ASK signal being sent at block 310). In another example, at block 308, the power receiver may reconfigure one or more settings of the power receiver. For example, the power receiver may change a modulation capacitor value, change the ASK modulation from capacitive modulation to resistive modulation, change a rectifier voltage target, and/or change a load current, etc. The process 300 may proceed from block 308 to block 306, where the power receiver may prepare the CEP. In an example, the next ASK signal being sent at block 310 may be a new ASK signal generated based on the reconfigured settings performed at block 308. The power transmitter may receive the new ASK signal and attempt to demodulate the new ASK signal.

Figure 4:
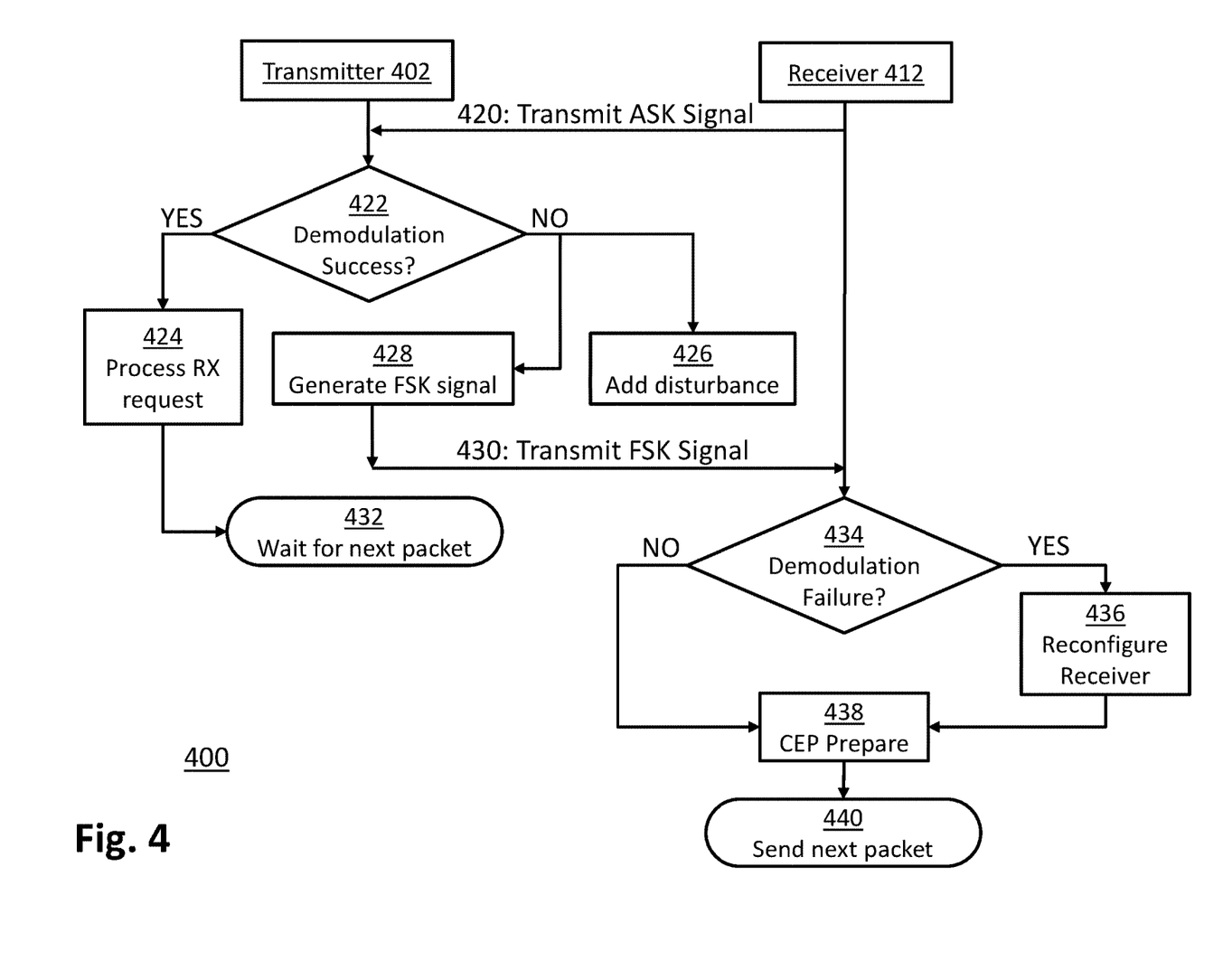
FIG. 4 is a flow diagram illustrating a process of implementing alternating communication for wireless power transfer in one embodiment.

FIG. 4 is a flow diagram illustrating a process 200 being performed by a power transmitter to implement alternating communication for wireless power transfer in one embodiment. The process 200 may include one or more operations, actions, or functions as illustrated by one or more of steps or blocks 420, 422, 424, 426, 428, 430, 432, 434, 436, 438, and/or 440. Although illustrated as discrete blocks, various blocks can be divided into additional blocks, combined into fewer blocks, eliminated, or performed in parallel, and/or performed in different order, depending on the desired implementation.

The process 400 may be implemented by a system that includes a transmitter 402 and a receiver 412. The transmitter 402 may be a wireless power transmitter and the receiver 412 may be a wireless power receiver. The process 400 may begin with a step 420, where the receiver 412 may transmit an ASK signal to the transmitter 402. The ASK signal may encode a RX message that specifies, for example, power transfer information such as, for example, an amount of power to be transferred to the receiver 412, commands to increase, decrease, or maintain a power level of AC power being transferred from the transmitter 402 to the receiver 412, commands to stop a power transfer, etc.

The process 400 may proceed to block 422, where the transmitter 402 may attempt to demodulate the ASK signal. In response to a successful demodulation of the ASK signal, the process 400 may proceed to block 424. At block 424, the RX message encoded in the ASK signal may be decoded. The transmitter 402 may process the decoded RX message, such as performing one or more functions in accordance with the contents of the message. For example, the transmitter 402 may transmit an amount of power, that was specified in the RX message, to the power receiver.

In response to a failure to demodulate the ASK signal, the process 400 may proceed to block 426 and/or 428. At block 428, the transmitter 402 may generate a FSK signal encoding a notification and/or a request. The notification can be a TX message indicating a failed attempt to demodulate the ASK signal, and the request can be a request to the receiver 412 to perform one or more functions to address the failed demodulation attempt. In an example, in addition to block 428, the transmitter 402 may perform block 426. At block 426, the transmitter 402 may, for example, add a disturbance to one of an input voltage, a working frequency, or a duty cycle of the power transmitter to amplify an amplitude difference in the ASK signal. The transmitter 402 may perform the blocks 426 and 428 in an arbitrary order or in parallel. The process 400 may proceed from block 426 and/or block 428 to a step 430. At step 430, the transmitter 402 may transmit the FSK signal to the receiver 412. The process 400 may proceed to block 432, where the transmitter 402 may wait for a next ASK signal from the receiver 412.

The process 400 may proceed from step 430 to block 434. At block 434, the receiver 412 may receive the FSK signal from the transmitter 402. The receiver 412 may demodulate the FSK signal to determine whether a notification of failed demodulation of ASK signal is in the TX message encoded in the FSK signal. In response to the TX message not including the notification, the process 400 may proceed to block 438. At block 438, the receiver 412 may prepare a control error packet (CEP) that may be sent to the transmitter 402 periodically. The process 400 may proceed from block 438 to block 440, where the receiver 412 may continue its operation and send a next ASK signal.

In response to the TX message including the notification, the process 400 may proceed to block 436. At block 436, the receiver 412 may perform one or more functions to address the failed demodulation. In an example, the TX message encoded in the FSK signal may include the notification but not the request to perform the one or more functions, and the receiver 412 may be configured or programmed to autonomously perform the one or more functions to address the failed demodulation in response to detecting the notification in the TX message encoded in the FSK signal. In another example, the TX message encoded in the FSK signal may include the request to perform the one or more functions and the receiver 412 may perform the requested functions in block 436. In an example, at block 436, the receiver 412 may resend the ASK signal to the power transmitter (e.g., as a next ASK signal being sent at block 440). In another example, at block 436, the receiver 412 may reconfigure one or more settings of the receiver 412. For example, the receiver 412 may change a modulation capacitor value, change the ASK modulation from capacitive modulation to resistive modulation, change a rectifier voltage target, and/or change a load current, etc. In an example, the next ASK signal being sent at block 440 may be a new ASK signal generated based on the reconfigured settings performed at block 440. In an example, the power transmitter may receive the new ASK signal from the receiver 412 and may attempt to demodulate the new ASK signal.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
 a controller configured to:
  receive an amplitude shift key (ASK) signal from a device;
  perform a demodulation on the ASK signal;
  in response to a failure to demodulate ASK signal, encode a notification of failure in a frequency shift key (FSK) signal; and
  transmit the FSK signal to the device.

2. The apparatus of claim 1, wherein the controller is a part of a wireless power transmitter, and the device is a wireless power receiver.

3. The apparatus of claim 1, wherein the controller is further configured to encode a request in the FSK signal, the request is for the device to perform a function to resolve the failure to demodulate the ASK signal.

4. The apparatus of claim 3, wherein the function is one of:
 resend the ASK signal by the device; and
 reconfigure a setting of the device to modify an ASK modulation function of the device.

5. The apparatus of claim 4, wherein the setting is one of:
 change the number of capacitors being used by the device to generate the ASK signal;
 change a modulation mode of the ASK signal between capacitive modulation and resistive modulation; and
 change a rectifier voltage target.

6. The apparatus of claim 4, wherein the controller is configured to:
 receive a new ASK signal based on the reconfigured setting; and
 demodulate the new ASK signal.

7. The apparatus of claim 1, wherein the controller is configured to:
 in response to the failure to demodulate the ASK signal, apply a disturbance to the ASK signal to amplify an amplitude difference among the ASK signal;
 demodulate the ASK signal with the amplified amplitude difference.

8. An apparatus comprising:
 a controller configured to:
  send an amplitude shift key (ASK) signal to a device;
  receive a frequency shift key (FSK) signal that encodes a notification of failure indicating a failure to demodulate the ASK signal; and
  perform a function to resolve the failure to demodulate the ASK signal.

9. The apparatus of claim 8, wherein the controller is a part of a wireless power receiver, and the device is a wireless power transmitter.

10. The apparatus of claim 8, wherein the FSK signal further encodes a request to the controller to perform the function.

11. The apparatus of claim 8, wherein the function is one of:
   resend the ASK signal; and
   reconfigure a setting of the apparatus to modify an ASK modulation function.

12. The apparatus of claim 11, wherein the setting is one of:
   change the number of capacitors being used to generate the ASK signal;
   change a modulation mode of the ASK signal between capacitive modulation and resistive modulation; and
   change a rectifier voltage target.

13. The apparatus of claim 11, wherein the controller is configured to generate a new ASK signal based on the reconfigure setting.

14. A system comprising:
   a transmitter;
   a receiver configured to be in communication with the transmitter, the receiver being configured to send an amplitude shift key (ASK) signal to the transmitter;
   the transmitter being configured to:
      receive the ASK signal from the receiver;
      perform a demodulation on the ASK signal;
      in response to a failure to demodulate the ASK signal, encode a notification of failure in a frequency shift key (FSK) signal; and
      transmit the FSK signal to the receiver;
   the receiver being further configured to:
      receive the FSK signal; and
      perform a function to resolve the failure to demodulate the ASK signal.

15. The apparatus of claim 14, wherein the transmitter is a wireless power transmitter, and the receiver is a wireless power receiver.

16. The apparatus of claim 14, wherein the FSK signal further encodes a request to the receiver to perform the function to resolve the failure of the demodulation.

17. The apparatus of claim 14, wherein the function is one of:
   resend the ASK signal by the device; and
   reconfigure a setting of the device to modify an ASK modulation function of the device.

18. The apparatus of claim 17, wherein the setting is one of:
   change the number of capacitors being used by the device to generate the ASK signal;
   change a modulation mode of the ASK signal between capacitive modulation and resistive modulation; and
   change a rectifier voltage target.

19. The apparatus of claim 17, wherein the receiver is configured to generate a new ASK signal based on the reconfigure setting.

20. The apparatus of claim 14, wherein the transmitter is further configured to:
   in response to the failure of the demodulation, apply a disturbance to the ASK signal to amplify an amplitude difference among the ASK signal;
   demodulate the amplified ASK signal.

\* \* \* \* \*